United States Patent [19]

Funabashi et al.

[11] 4,264,422
[45] Apr. 28, 1981

[54] METHOD FOR PRODUCING SHAPED ARTICLES BY ELECTRODEPOSITIONAL SHAPING FROM FIBROUS SUBSTANCE HAVING ELECTROPHORETIC PROPERTY AND APPARATUS FOR SAME

[75] Inventors: Masayuki Funabashi; Tohshichi Kitago; Masakazu Takaiwa; Naohiro Murayama, all of Iwaki, Japan

[73] Assignee: Kureha Kagaku Kogyo Kabushiki Kaisha, Tokyo, Japan

[21] Appl. No.: 139,737

[22] Filed: Apr. 14, 1980

[30] Foreign Application Priority Data

Apr. 26, 1979 [JP] Japan .................................. 54-51938

[51] Int. Cl.³ .......................... C25D 1/18; C25D 1/20; C25D 13/14
[52] U.S. Cl. ............................ 204/181 F; 204/299 EC
[58] Field of Search ....................... 204/181 F, 299 EC

[56] References Cited

U.S. PATENT DOCUMENTS 3,556,969  1/1971  Mizuguchi et al. .............. 204/181 F
4,170,542  10/1979  Chronberg ....................... 204/181 F Primary Examiner—Howard S. Williams
Attorney, Agent, or Firm—Wegner & Bretschneider

[57] ABSTRACT

Disclosed herein a method for producing shaped articles by electrodeposition utilizing the electrophoretic fibrous substance suspended in an aqueous medium, wherein by deflecting the direction of the flow of the above-mentioned aqueous suspension of the fibrous substance into at least two mutually different direction in the vicinity of the surface of electrode onto which the fibrous substance is deposited electrically in the course of electrodeposition, the thus obtained shaped articles are given a laminated layer-structure of the deposited fibrous substance, in which the direction of orientation of the fibrous substance in the layer is different from layer after layer resulting in a highly raised mechanical strength of the thus shaped articles, and a means for installing the device deflecting the direction of flow of the above-mentioned aqueous suspension into at least two mutually different directions.

10 Claims, 3 Drawing Figures

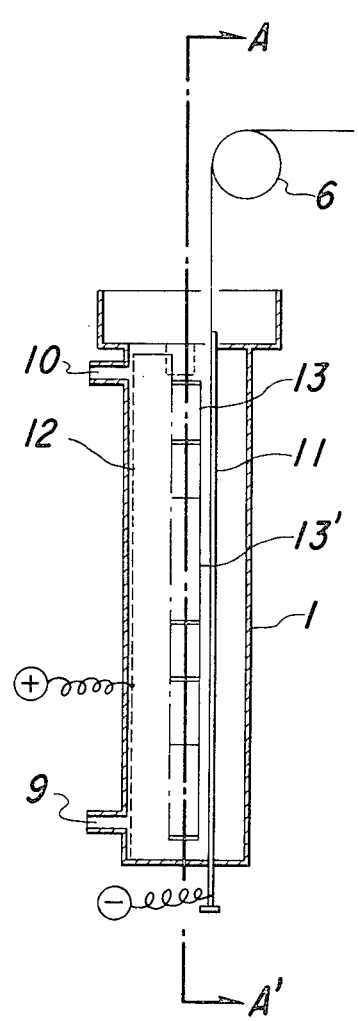
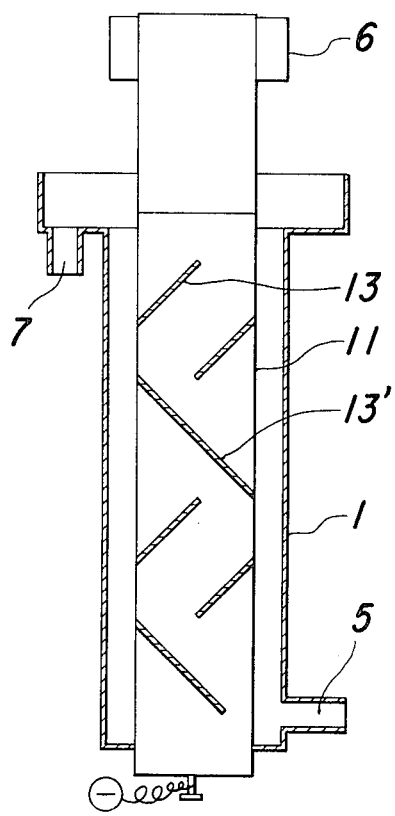

METHOD FOR PRODUCING SHAPED ARTICLES BY ELECTRODEPOSITIONAL SHAPING FROM FIBROUS SUBSTANCE HAVING ELECTROPHORETIC PROPERTY AND APPARATUS FOR SAME

BACKGROUND OF THE INVENTION

The present invention concerns a method for producing shaped articles having a high mechanical strength by applying a technique of electrodeposition on an aqueous suspension of a fibrous substance having an electrophoretic property, and an apparatus for producing the same.

The herein used term, "a fibrous substance having an electrophoretic property" means a fibrous protein such as collagen contained in skins and tendons of mammals, fibroin in silk, keratin in hair, fibrinogen in blood, myosin in muscles and casein in milk, as well as polysaccharides having a fiber-forming property such as chitin and alginic acid.

Hitherto, methods for producing shaped articles such as casings for packing of sausages, threads for surgical operation, guts for tennis-racket and sheets for artificial skin by electrodepositional shaping of a fibrous substance having an electrophoretic property, for instance, a proteinous fibril such as collagen have been known. The above-mentioned publicly known method, for instance as is disclosed in Japanese Patent Publication No. 13636/1971, comprises a process in which an aqueous suspension of the above-mentioned proteinous fibril is supplied into a vessel provided with at least one cathode and at least one anode, and by impressing a direct electric potential between the two electrodes, the above-mentioned proteinous fibril is accumulated electrodepositionally onto the surface of one of the electrodes to form shaped articles.

In the above-mentioned method, when the pH of the above-mentioned aqueous suspension is adjusted to lower than 6, the proteinous fibrils are electrically deposited selectively on the surface of cathode, and on the other hand when it is adjusted to higher than 9, the proteinous fibrils are electrically deposited selectively onto the surface of the anode.

However, in the above-mentioned method of electrodeposition, when the operation is continuously carried out, since the electrodeposited shaped articles are continuously removed away from the electrode and the aqueous suspension of the proteinous fibril is continuously supplied into the vessel of electrodeposition as a raw material, the proteinous fibrils in the aqueous suspension electrophoretically move to the almost same direction as the direction of the flow of the aqueous suspension (the aqueous suspension flows to a fixed direction in the vessel of electrodeposition) and deposit on the surface of electrode.

Accordingly, the electrodepositionally shaped articles have a structure in which the proteinous fibrils are oriented almost into one and same fixed direction and so, there is a defect that the article is mechanically weaker.

In consideration of the above-mentioned situation, Japanese Patent Publication No. 24257/1972 proposes the following method according to which the mechanical strength of the shaped articles obtained by the process of continuous electrodeposition will be improved.

That is, in the case where an aqueous suspension of proteinous fibril of protein is continuously introduced into the vessel of electrodeposition in the same procedures as described above and the proteinous fibrils are electrically deposited from the suspension to the prescribed surface of the electrode, and the thus shaped articles by electrodeposition of the proteinous fibril is continuously removed from the vessel, the aqueous suspension in the vessel of electrodeposition is given a flow to the direction different from the direction of removing the shaped product and thus the fibrils being deposition in the shaped article take an entangled structure and the mechanical strength of the shaped article is improved.

In addition, the apparatus for production of the above-mentioned shaped articles disclosed in the above-mentioned Publication comprises a vessel for electrodeposition provided with at least one pillar-shaped electrode for the base of electrodeposition, at least one opposing electrode, a means for continuously removing the pipe-shaped articles electrically deposited on the surface of the above-mentioned electrode for the base of electrodeposition from the vessel for electrodeposition and a means for giving a flow of a different direction from the direction of removing the above-mentioned formulated objects to the aqueous suspension of proteinous fibrils, introduced into the vessel for electrodeposition. The means for giving the above-mentioned flow to the above-mentioned aqueous suspension disclosed in the above-mentioned Publication comprises a method in which a spirally ascending flow is caused in the above-mentioned aqueous suspension by installing spiral ribbon(s) in the inner surface of the vessel for electrodeposition and by forwarding the aqueous suspension from the lower region of the vessel to the tangential direction against the cross section of the vessel, or a method in which a rotary flow is caused in the above-mentioned aqueous suspension by rotating a stirrer around the above-mentioned pillar-shaped electrode onto which the fibrous substance is to be electrodeposited, the stirrer having been installed on the opposite electrode or installed separately.

However, according to the method and the apparatus disclosed in the above-mentioned Japanese Patent Publication No. 24257/1972, although the proteinous fibrils in the shaped articles obtained as the articles electrodeposited onto the electrode have entangled mutually owing to the intra-vessel flow of the aqueous suspension into the different direction to the direction of removing the shaped articles, since the above-mentioned aqueous suspension has only one direction of rotation, the shaped article obtained as the electrodeposited body on the electrode is composed of a single layer in which only one and same structure substantially presents. Accordingly, the mechanical strength of the shaped article obtained by the application of the above-mentioned method and apparatus is not satisfactory.

The inventors of the present invention, as a result of studies based on the presumption that the mechanical strength of the electrodeposited shaped article consisting of the above-mentioned fibrous substance will be remarkably improved by giving the shaped article a laminated layer structure of the fibrous substance, each layer having direction of orientation of the fibrous substance different from each other, have found that in the process of electrodeposition, such laminated layers in the deposited shaped articles are available and as a result, the mechanical strength of the thus obtained shaped article is extremely improved by causing at least two flows different from each other in direction in the aqueous suspension of the above-mentioned fibrous substance during the operation of electrodeposition.

Accordingly, one object of the present invention is to offer a method for producing, from an aqueous suspension of an electrophoretic fibrous substance, the shaped articles excellent in mechanical strength comprising a structure of laminated layers of the fibrous substance, in which the direction of orientation of the fibrous substance in the layer is different from layer after layer.

Another object of the present invention is to offer an apparatus for producing continuously the above-mentioned shaped articles from the above-mentioned aqueous suspension of the fibrous substance.

Still another object of the present invention is to offer shaped articles having a high mechanical strength comprising laminated layers of the above-mentioned fibrous substance, the direction of the orientation of the fibrous substance in each layer of the laminated layers being different from layer after layer.

BRIEF EXPLANATION OF DRAWINGS

FIG. 2 is a vertical sectional plan for another exemplification of the apparatus of the present invention.

FIG. 3 is a sectional plan in the direction of A–A' of FIG. 2.

DETAILED DESCRIPTION OF THE INVENTION

Figure 1:
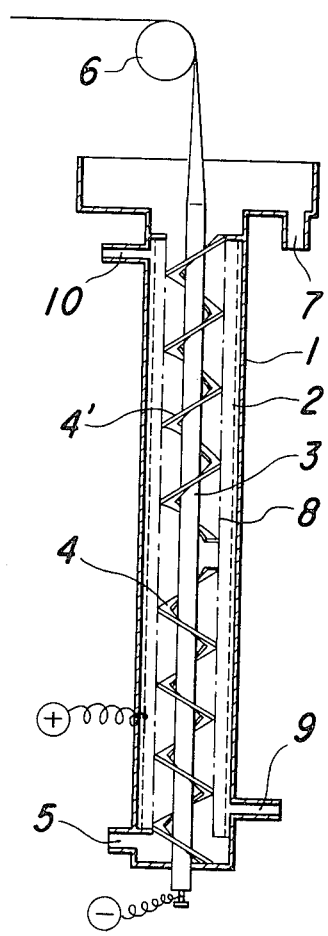
FIG. 1 is a vertical sectional plan for the exemplification of the apparatus of the present invention.

The characteristic feature of the present invention is, in the electrodeposition of a fibrous substance having an electophoretic property and having been suspended in an aqueous medium, to cause at least two flows different in direction in the aqueous suspension introduced into a vessel for electrodeposition, particularly in the vicinity of the surface of electrode onto which the fibrous substance in the aqueous suspension is deposited. Accordingly, the characteristic feature of the apparatus of the present invention is the installation of the means for causing the above-mentioned flows in the above-mentioned aqueous suspension within the vessel for electrodeposition.

The present invention will be explained in detail while referring to the Drawings as follows:

According to the process of the present invention, at the first place, an aqueous suspension of a fibrous substance having an electrophoretic property, as the starting material, is prepared by an ordinary procedure. For instance, in the case of using a raw hide of mamals as the starting material, it is finely cut by a slicer and after delining and fine-cutting by a refiner, it is brought into suspension in water at a content of about 1% of solid in the thus prepared suspension and the pH of the aqueous suspension is adjusted to lower than 6, for instance 3.5 to be the starting material.

In the next place, the thus prepared aqueous suspension is introduced into a cylindrical vessel for electrodeposition shown in FIG. 1. The cylindrical vessel 1 for electrodeposition (hereinafter referred to as E.D. vessel) for use in the process of the present invention is provided with at least one cylindrical anode 2 within E.D. vessel 1 and at least one cylindrical cathode 3 in the central region of E.D. vessel. Around the cathode 3, two spirally formed guide plates 4 and 4' are installed, these guide plates being so designed that the flow of the above-mentioned aqueous suspension in E.D vessel is deflected into at least 2 mutually different directions by them. In the lower region of E.D. vessel 1, a supply port 5 for the aqueous suspension and in the upper region of E.D. vessel 1, a roller 6 for taking out the shaped articles electrodeposited onto cathode 3 from E.D. vessel 1 are respectively installed.

In addition, the apparatus shown in FIG. 1 is provided with a diaphragm 8 between anode 2 and cathode 3, and the acidic solution such as an aqueous hydrochloric acid solution is place between the diaphragm 8 and anode 2 to prevent the fluctuation of pH in the liquids in the anode chamber and the cathode chamber. In FIG. 1, the outlet of the effluent aqueous suspension, the inlet for the acidic solution and the outlet for the acidic solution are shown by 7, 9 and 10, respectively.

On carrying the electrodepositional shaping with the introduction of the aqueous suspension of the above-mentioned fibrous substance into the above-mentioned apparatus for electrodeposition, the aqueous suspension is introduced into E.D. vessel 1 from the supply port 5, and a direct electrical potential is applied between the above-mentioned anode 2 and cathode 3.

Then the introduced aqueous suspension flows along the above-mentioned guide plates 4 and 4' with a spiral motion, the direction of the spiral motion being, as is shown in FIG. 1, counter clock-wise in the region at the lower part of cathode 3 by the guide plate 4, and on the other hand, clock-wise in the region at the upper part of cathode 3 by the guide plate 4'. Naturally, almost all the length-wise directions of the respective fibrils in the aqueous suspension are equal to the direction of spiral motion of flow of the aqueous suspension, and accordingly, the shaped article formed by the electrodeposited fibrous substance onto the cathode 3 comprises laminated layers having different orientation of the fibrous substance from layer after layer.

The apparatus according to the present invention, as is shown in FIG. 1, in the case where the fibrous substance is to be electrodeposited onto the outer circumference of one electrode, may be provided with at least more than two guide plates 4(s) in spiral with at least more than one pitch, for instance four or six plates with their direction of spiral inversed alternately. In addition, it is preferable that the guide plates 4 are installed almost all over the surface of the electrode onto which the fibrous substance is electrodeposited, however, there are some cases where the guide plates are installed only at the end parts of the electrode. The lead angle of the above-mentioned guide plate 4 is preferably 30° to 60°, more preferably 40° to 50°. In the case of the angle of smaller than 30°, since the resistance of the plate to the liquid is too large, the liquid goes straight between the electrode and the guide plate with the result that the orientation of the fibrous substance is directed to the direction of the flow of the liquid. Accordingly, the purpose of installing the guide plate is not achieved. On the other hand, in the case of the angle of larger than 60°, the effect of directing the orientation of the lengthwise direction of the fibrous substance is too weak. Accordingly, the angle of larger than 60° is also unfavorable.

In addition, it is preferable to install the guide plates at a distance of 1 to 13 mm, more preferably 3 to 8 mm apart from the surface of the electrode onto which the fibrous substance accumulates.

FIGS. 2 and 3 show the other instances of the apparatus of the present invention, in which the E.D. vessel 1 is provided with two plate-shape electrodes 11 and 12 placed face to face. Of these electrodes, in the vicinity of the surface of the electrode onto which the fibrous substance is to be electrodeposited (electrode 11 in Figure), more than two guide plates 13, 13' ... are installed, the plates having different directions.

In addition, as the apparatus shown in FIG. 1, the apparatus shown in FIGS. 2 (and 3) has the inlet 5 of the aqueous suspension, the roller 6 for taking out of the shaped articles, the supply port 9 for the acidic solution and the outlet 10 of the solution.

On carrying out electrodeposition by the use of the apparatus shown in FIGS. 2 (and 3), the similar procedures to those taken in the operation of the apparatus shown in FIG. 1 may be preferably taken. In this case, since the aqueous suspension of the fibrous substance introduced into E.D. vessel 1 flows along the guide plates 13, 13' ..., the shaped articles, comprising laminated layers with each layer comprising the desposited fibrous substance having different direction of orientation from layer after layer corresponding to the number of guide plates installed in E.D. vessel 1, are obtained. For instance, with four guide plates so installed that their directions are different among them, the shaped articles with a four-layered structure in which the direction of orientation of the deposited fibrous substance is different from layer after layer are obtained.

Moreover, the multi-layered shaped articles are also available by altering the lead angle of the above-mentioned lead plates 13, 13' ... in the range between 30° to 60° while altering the flow rate of the above-mentioned aqueous suspension in the range between 5 to 50 cm/sec during the operation of electrodeposition.

By the way, it is naturally possible, in cases of electrodeposition of the above-mentioned fibrous fubstance using the apparatus shown in FIG. 1 or 2, to have the fibrous substance deposited on the surface of anode by adjusting the pH of the aqueous suspension in an alkaline region.

According to the present invention, other fiber-formable substances such as chitin and alginic acid than the proteinous fibers such as collagen, fibroin, keratin, fibrinogen, myosin and casein are possibly electrodeposited to be shaped articles, as has been described.

In addition, the aqueous suspension of each substance for use in electrodeposition may contain several additives unless they give harmful effects on the operation of electrodeposition. As such an additive, for instance, reinforcing fibers, fillers, defoaming agents, surfactants, etc. may be mentioned.

The content of solid matter in the above-mentioned aqueous suspension for use in electrodepositional shaping according to the present invention is not specifically limitative, and as in conventional methods, the content in percentage of 0.3 to 1.0% by weight based on the fibrous substance in dryness may be preferable.

In addition, the temperature and the flow rate of the aqueous suspension in the process of electrodeposition according to the present invention as well as the voltage of direct current in that case may be adjusted not limitatively in accordance with the conventional method.

According to the present invention, by selecting the form and shape of the electrode onto which the fibrous substance is electrodeposited, not only the pipe-form shaped articles but also variously shaped articles such as sheets for artificial skin, threads for surgical operations and guts for racket are optionally produced.

Since the shaped articles obtained according to the present invention comprise, as has been described, laminated layers with the direction of orientation of the layer-forming fibrous substance different from layer after layer, their mechanical strength in longitudinal direction is scarcely different from that in transversal direction, and they are extremely higher than the mechanical strength of the shaped articles obtained according to the conventional methods, and particularly, the tear-strength of the shaped articles obtained according to the present invention has been remarkably improved.

The followings are the concrete explanation of the present invention while referring to Examples, and the superiority of the present invention to the conventional methods is explained by the comparison to Comparative examples of the conventional methods.

EXAMPLE 1

An E.D. vessel comprising a cylindrical vessel made of vinyl chloride resin, 100 mm in inner diameter and 700 mm in height, provided with a cylindrical platinum wire netting of 75 mm in diameter as the anode therein, a diaphragm within the wire netting, a stainless-steel tube of 17 mm in outer diameter as the cathode in the central region of the vessel and a spiral-form guide plate around the above-mentioned anode, as shown in FIG. 1 was used for electrodeposition. The lead angle of the above-mentioned guide plate was 45°, and the spiral had 4 pitches so that the aqueous suspension introduced into E.D. vessel rotated counterclockwise in the region at the lower part of the cathode and rotated clock-wise in the region at the upper part of the cathode.

After introducing an aqueous hydrochloric acid solution of pH of 2.5 between the cathode and the diaphragm, an aqueous suspension of 0.5% by weight of fibrous collagen prepared in advance at pH of 3.6 was introduced from the supply port into the space between the cathode and the diaphragm at a flow rate of 25 cm/sec while applying a potential of 500 V between the electrodes to electrically deposit the fibrous collagen onto the cathode. The thus deposited tubular shaped articles were taken out from E. D. vessel by a roller installed at the upper part of the vessel at a pulling-up velocity of 8 m/min to be a collagen-casing (A) of 15 microns in thickness as the product.

EXAMPLE 2

In E.D. vessel used in Example 1, instead of the spiral guide plate, four plates designed to give rotating motions successively of counter clock-wise, clock-wise, counter clock-wise and then clock-wise to the flow of the aqueous suspension were installed.

Collagen casing (B) (with the thickness of 15 microns) was produced in the thus modified apparatus under the same conditions as in Example 1.

COMPARATIVE EXAMPLE 1

Except for using an E.D. vessel without the installation of spiral guide plate instead of using E.D. vessel of Example 1, collagen casing (C) was produced in the same procedures as in Example 1.

COMPARATIVE EXAMPLE 2

Using an E.D. vessel provided with a stirrer around the cathode instead of the spiral guide plate for giving a rotary flow to the aqueous suspension, collagen casing (D) was produced by the same procedures as in Example 1.

COMPARISON OF THE PRODUCTS OF EXAMPLES 1 and 2 AND COMPARATIVE EXAMPLES 1 AND 2

Tensile strength and tear strength of the respective products (A), (B), (C), and (D) were determined in accordance with the respective methods of the Japanese Industrial Standard (JIS) P8113 and P8116. The results are shown in the following Table:

TABLE

| Item Specimen | Tensile strength ($kg/mm^2$) | | Tear strength (g.cm/cm) | |
|---|---|---|---|---|
| | Longitudinal | transversal | longitudinal | transversal |
| (A) | 2.7 | 2.8 | 30 | 32 |
| (B) | 2.7 | 2.9 | 38 | 35 |
| (C) | 2.8 | 1.5 | 12 | 20 |
| (D) | 2.5 | 1.8 | 15 | 21 |

From the above-mentioned Table, it will be easily understood that the collagen casings (A) and (B) obtained by the method of the present invention are remarkably superior to those (C) and (D) obtained in Comparative examples according to the conventional methods in their tensile strength and tear strength.

What is claimed is

1. A shaped article by electrodepositionally shaping a fibrous substance having an electrophoretic property in an aqueous suspension, said shaped article having a structure in which at least two layers of said fibrous substance are laminated in such a manner that the direction of orientation of said fibrous substance in said layer is different from layer after layer, and having a tensile strength of at least 2.5 $kg/mm^2$ and a tear strength of at least 25 g.cm/cm.

2. A method for producing shaped articles composed of a fibrous substance having an electrophoretic property from an aqueous suspension of said fibrous substance by electrodepositional shaping, comprising giving at least two rotating motions different to each other to the flow of said aqueous suspension in the vicinity of the surface of an electrode onto which said fibrous substance is electrically deposited.

3. A method according to claim 2, wherein said at least two rotating motions are given to the flow of said aqueous suspension by installing at least two guide plates at the respectively different directions in the vicinity of said surface of said electrode.

4. A method according to claim 2, wherein said at least two rotating movements are given to the flow of said aqueous suspension by installing at least two spiral guide plates each having at least one pitch at the respectively different directions in the vicinity of said surface of said electrode.

5. An apparatus for electrodepositionally shaping a fibrous substance having an electrophoretic property comprising a vessel provided with at least one cathode, at least one anode and at least two guide plates installed at the respectively different directions in the vicinity of one of said electrodes onto which said fibrous substance is electrically deposited.

6. The apparatus according to claim 5, wherein each of said guide plates has a lead angle of 30° to 60°.

7. The apparatus according to claim 5, wherein said guide plates are installed at a distance of 1 to 13 mm apart from said surface of said electrode onto which said fibrous substance is electrically deposited.

8. An apparatus for electrodepositionally shaping a fibrous substance having an electrophoretic property comprising a vessel provided with at least one cathode, at least one anode and at least two spiral guide plates with at least one pitch installed at the respectively different direction in the vicinity of the surface(s) of said cathode(s) or anode(s) onto which said fibrous substance is to be electrically deposited.

9. The apparatus according to claim 8, wherein each of said spiral guide plates has a lead angle of 30° to 60°.

10. The apparatus according to claim 8, wherein said spiral guide plates are installed at a distance of 1 to 13 mm apart from said surface(s) of said cathode(s) or said anode(s) onto which said fibrous substance is to be electrically deposited.

* * * * *